US006440564B1

(12) United States Patent
McLain et al.

(10) Patent No.: US 6,440,564 B1
(45) Date of Patent: Aug. 27, 2002

(54) METHOD OF PRODUCING A RELATIVELY SOFT PRODUCT, AND THE PRODUCT ITSELF

(75) Inventors: John Dunn McLain, Holywell; Brian Hunt, Huntington; George Rutherford, Whickam, all of (GB)

(73) Assignee: SCA Hygiene Products GmbH, Mannheim (DE)

( * ) Notice: Subject to any disclaimer, the term of this patent is extended or adjusted under 35 U.S.C. 154(b) by 0 days.

(21) Appl. No.: 09/498,661

(22) Filed: Feb. 7, 2000

Related U.S. Application Data

(63) Continuation of application No. PCT/EP98/04435, filed on Jul. 16, 1998.

(30) Foreign Application Priority Data

Aug. 8, 1997 (DE) ........................................ 197 34 414

(51) Int. Cl.[7] ................................................ B32B 9/00

(52) U.S. Cl. ....................... 428/409; 428/156; 428/178; 428/212; 428/338; 156/219; 156/221; 156/224; 156/229

(58) Field of Search ................................ 428/198, 221, 428/171, 156, 141, 178, 212, 338, 409; 156/60, 62, 183, 221, 224, 229, 219

(56) References Cited

U.S. PATENT DOCUMENTS 5,229,186 A * 7/1993 Tribble et al. .............. 428/156
5,296,289 A 3/1994 Collins

FOREIGN PATENT DOCUMENTS

| | | |
|---|---|---|
| AU | 000253 | 5/1995 |
| DE | 681812 | 9/1939 |
| DE | 19509863 | 4/1996 |
| EP | 0313766 | * 9/1988 |
| EP | 0313766 | 5/1989 |
| EP | 0742148 | 11/1996 |
| FR | 2193709 | 2/1974 |
| GB | 1409465 | 8/1975 |

OTHER PUBLICATIONS

Official Action of the German Patent and Trademark Office in DE 19734414.3–45, dated Apr. 3, 2001 (English translation provided).

Copy of the page of Webster's Dictionary defining the word "loft".

* cited by examiner

*Primary Examiner*—Merrick Dixon
(74) *Attorney, Agent, or Firm*—Dilworth & Barrese LLP

(57) ABSTRACT

The invention relates to a relatively soft, largely planar, though three-dimensional product, obtainable by means of an embossing tool for converting a relatively soft, planar starting product as a result of embossing to the extent that an embossing pattern exists which comprises a plurality of "hinged parallelograms" that are limited by lines of compressed material such that when tractive forces are applied, this hinged parallelogram structure behaves like a pantograph and a secondary bulk is superimposed as a result of a stretching process on the primary bulk produced by the embossing.

36 Claims, 11 Drawing Sheets

METHOD OF PRODUCING A RELATIVELY SOFT PRODUCT, AND THE PRODUCT ITSELF

This application is a continuation of application Ser. No. PCT/EP98/04435, filed Jul. 16, 1996.

BACKGROUND OF THE INVENTION

The invention relates to a method of producing a relatively soft, essentially planar, though three-dimensional product and to a corresponding product itself. Such products as largely planar products are usually increased in terms of their volume by means of an embossing process. This increase in volume (bulking) may affect appearance on the one hand, and technical properties on the other. If a tissue or a similar paper product for example is provided with an embossment, the properties of touch and feel can thereby be improved in addition to an enhanced appearance. As well as these properties of touch, the product's absorption properties may also be improved by the starting product's conversion as a result of embossing. As far as the method and product according to the invention are concerned, a wide variety of materials is relevant, particularly e.g. with regard to paper: tissue (creped or uncreped, wet-laid, single-layered or multilayered), absorbent cotton; with regard to textiles: all soft textiles, woven fabrics, so-called "non-wovens" (e.g. dry-laid), textile laminates; with regard to synthetics: all soft plastics as a foil or fiber composite; with regard to leather: all soft leathers; with regard to metal: thin metal foils, particularly aluminum foils.

SUMMARY OF THE INVENTION

As far as embossing is concerned, a wide variety of embossing techniques is relevant, as are already well-known to the skilled person.

In terms of the known techniques, the invention is based on the problem (object) of creating a product of the aforementioned type which has much improved visual and/or tactile properties by use of simple means.

This problem is solved by a method of producing a relatively soft, essentially planar, though three-dimensional product including the production steps of:

a) converting a relatively soft, essentially flat planar initial product by embossing a three-dimensional pattern that generates a primary bulk with respect to the initial product; and b) stretching this intermediate product achieved by embossing of the initial product essentially in the direction of its largely planar extension for generating a superimposed, secondary bulk with respect to the intermediate product.

It is a surprise that at least in terms of appearance and tactile properties, an embossed intermediate product can consequently be improved in a particularly simple manner in terms of a secondary bulk when the embossed intermediate product undergoes a stretching process.

This secondary bulk particularly has the effect as a superimposition of that bulk which was brought about by embossing when the intermediate product's embossing pattern is formed from a plurality of hinged parallelograms crosslinked together and when stretching takes place to optimum effect for example in a direction which runs diagonally through the parallelograms and particularly through diagonally opposite hinge points, which do not of course represent genuine hinge points in the mechanical sense but are arrived at from the embossing process to the extent that lines of compressed material intersect and limit the parallelograms which when crosslinked subsequently act in a manner similar to a pantograph when the stretching forces are applied.

Bulking is defined by the largely planar initial product's raised (bulged) portions that are produced by embossing, with the result that bulking primarily takes place in the direction perpendicular to the large surface of the initial product.

The phrase "relatively soft" implies the necessity of actually being able to perform an embossing process. The phrase nevertheless also implies the product's deformability to the extent that a lasting deformation can be achieved by the stretching process just as much as it can be achieved by the embossing process. The product is also intended to have a certain and optionally a particular flexibility and softness in its final state, depending on the actual application and depending on whether emphasis is placed on the appearance or on tactile properties.

The problem is also solved by a relatively soft, largely planar, though three-dimensional product that has a three-dimensional embossing pattern and a secondary bulk superimposed on this embossing pattern as an inherent primary bulk. The secondary bulk may be convex and it may be disposed on the convex side of the embossing pattern which forms the primary bulk. The secondary bulk in this sense may be concave.

The embossing pattern need not, but may, be symmetrical.

The secondary bulk can be achieved in a particularly beneficial manner if within the embossing pattern, the individual embossed shapes—as a horizontal projection—have a form which is located between the shape of a circle and that of a square or rectangle. A clear deviation from the circular form is nevertheless to be present. For example, the embossing pattern on the whole forms a rhombic pattern.

Lines that are essentially embossed on a plane are expediently formed in the embossing pattern between the individual shapes; these lines are connected together and four thereof respectively form a "hinged parallelogram". Many such hinged parallelograms are crosslinked together, as has already been mentioned in conjunction with the method. These lines intersect one another, whereby the points of intersection form hinge points in a manner resembling a pantograph when the aforementioned stretching forces are applied in the correct manner. The lines may be linear, but do not have to be so, between these intersections (hinge points). They may adopt a curved course such as in a so-called oriental or Venetian pattern. What is essential is the behavior as a pantograph when corresponding stretching forces are applied.

The relatively soft, largely planar, though three-dimensional product is particularly obtainable by means of a planar three-dimensional intermediate product provided with an embossing pattern that forms a primary bulk and which is produced by using an embossing tool; as a result of stretching essentially in the direction of its largely planar extension, this intermediate product is lent a lasting secondary bulk that is superimposed on the primary bulk. In other words, the embossing tool based on its design substantially affects the superimposed lasting secondary bulk brought about by stretching.

The use of a so-called "female" embossing tool that has recesses into which the material of the planar initial product is pressed for the lasting primary bulk is particularly expedient. In this regard, the embossing tool does in fact comprise webs that are connected with one another between the recesses and which together with the recesses lend the intermediate product an embossing pattern in that convex (raised) portions corresponding to the recesses are limited by lines of compressed and hence strengthened material, these lines being embossed by the webs. As a result of "female" embossing, these lines form in a particularly beneficial manner hinged parallelograms connected together in a network-like way such that this network acts as a pantograph when opposite stretching forces are applied in the direction of the large planar extension and essentially in the diagonal direction of the intermediate product's hinged parallelograms. Correspondingly, the hinged parallelogram should be oriented with respect to the machine direction if the stretching is made in machine direction.

Secondary bulking can be achieved particularly effectively when within the embossing tool, the side walls of the recesses extend on all sides at a specific acute angle, starting from the tool surface. This angle should preferably be not less than about 40° and particularly not less than about 60°. In a particularly advantageous manner, this angle amounts to 65°.

The number of individual shapes per square centimeter also positively influences the formation of the secondary bulk. In this way, this number of individual shapes per square centimeter may be 0.5 to 6 and particularly 1 to 2.5.

The dimension of the embossing tool's recesses likewise affects the formation of the lasting secondary bulk as a result of stretching. In this way, the ratio of the depth of the recesses to the width may be 0.1 to 0.5 and particularly 0.2 to 0.3.

The recesses within the embossing tool may comprise graduated side walls such that starting from the tool surface, a plurality of wall portions is juxtaposed into the depth of the recesses and the acute angles formed by the wall portions relative to the tool surface decrease in size from wall portion to wall portion.

The webs between the embossing tool's recesses may preferably have a width of 0.5 mm to 3 mm and particularly of 1.2 mm to 2.2 mm. A profile may also be provided within these webs and a row of recesses formed along these webs may particularly be provided therein. As a result, raised (bulged or convex) portions are formed as additional bulks within the product's embossed lines.

BRIEF DESCRIPTION OF THE DRAWINGS

The invention will be explained in further detail as follows by means of a few exemplary embodiments which are depicted in the drawings in a purely schematic fashion.

DESCRIPTION OF THE PREFERRED EMBODIMENTS

Figure 1A:
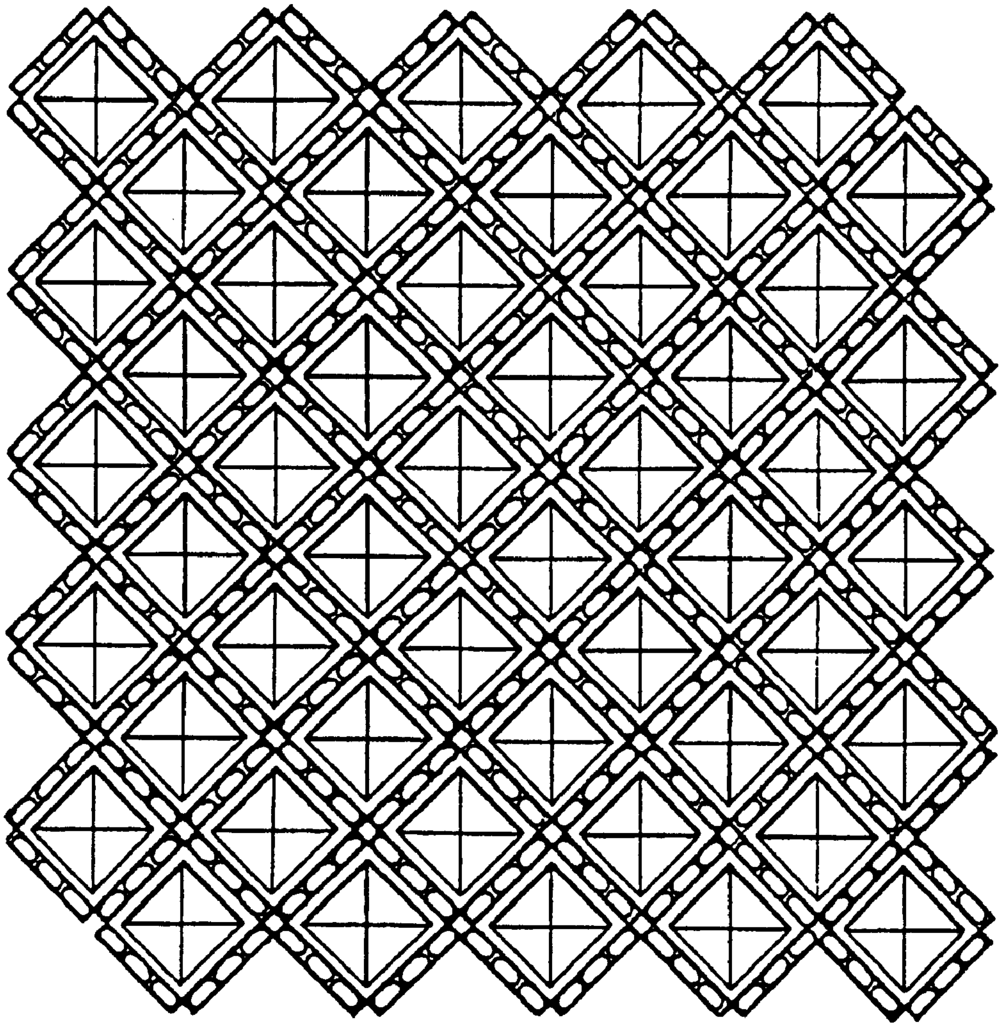
FIG. 1*a* shows the schematic horizontal projection of a tissue product's embossing pattern.
Figure 1B:
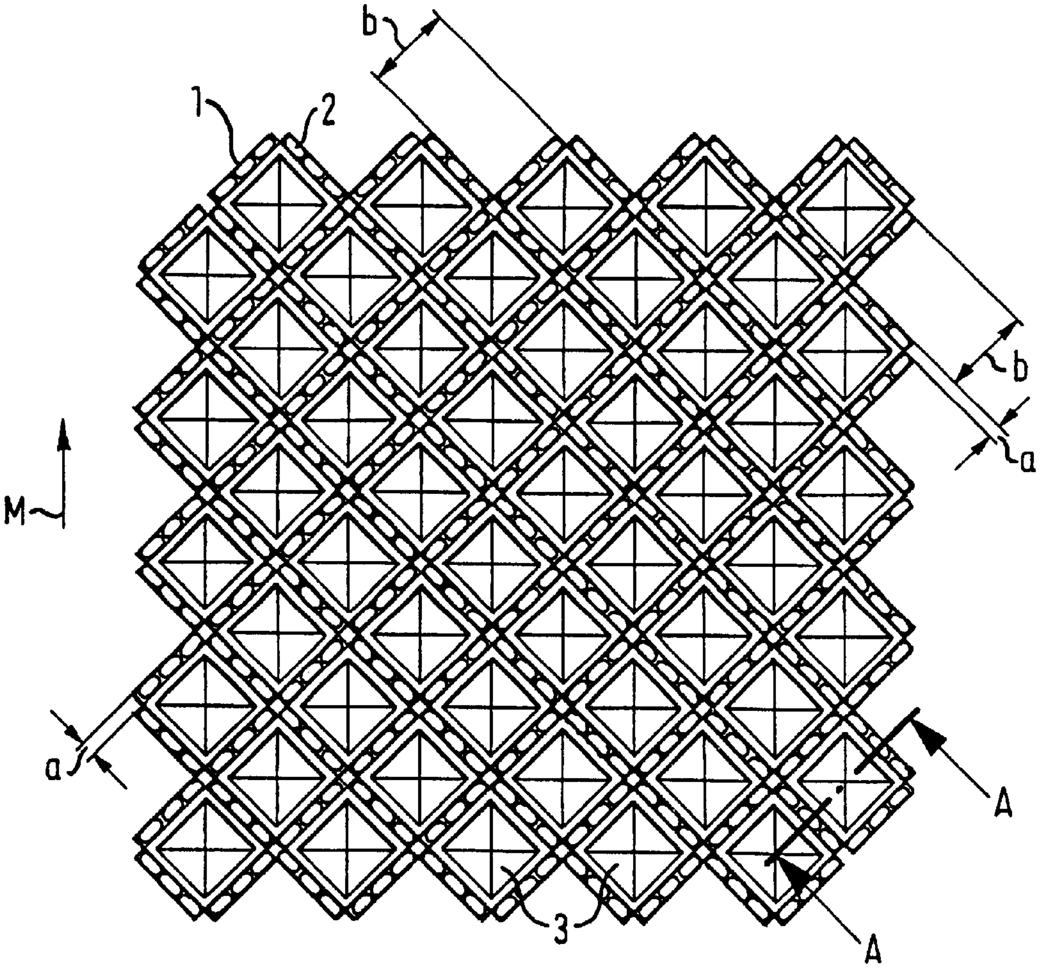
FIG. 1*b* shows a horizontal projection of an embossing tool for producing the product according to FIG. 1*a;*

Matching patterns are portrayed in the drawings, for example FIGS. 1*a* and 1*b*, though in such a way that FIG. 1*a* in the sense of the tool pattern would have to be regarded as the embossed pattern (inversed view) and FIG. 1*b* as the embossing tool's corresponding pattern itself. Since—particularly in terms of the intermediate product—the product is produced by means of the embossing tool, only the embossing tool will be described in the following on the basis of the three exemplary embodiments, because the product as such is also thereby characterized.

Figure 1C:
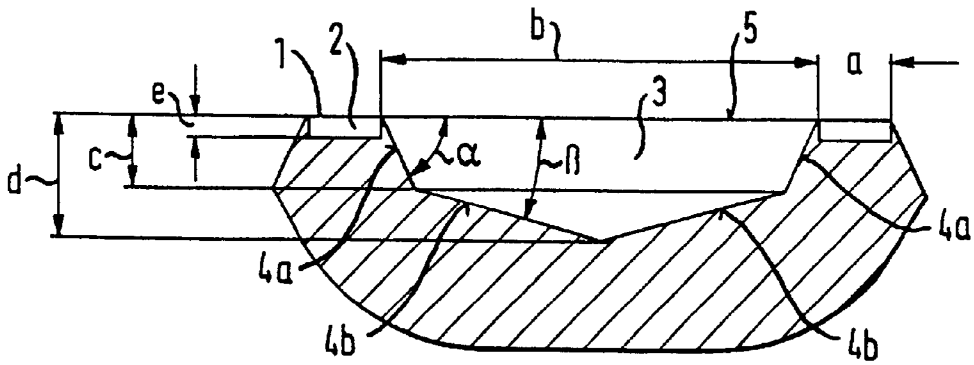
FIG. 1*c* shows a partial sectional view according to line A—A in FIG. 1*b;*
Figure 2A:
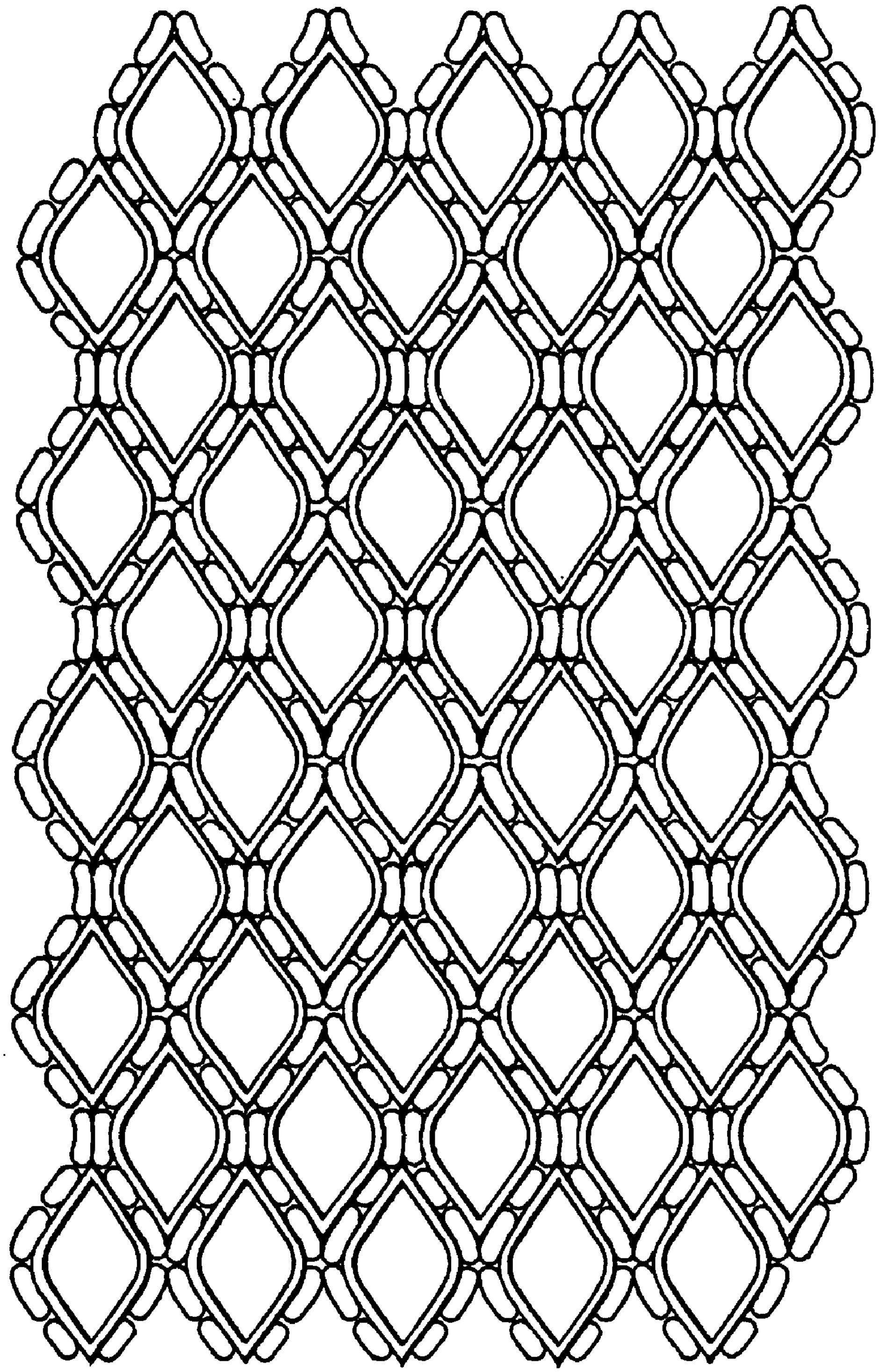
FIGS. 2*a* to 2*c* show views similar to FIGS. 1*a* to 1*c*, but with a pattern performed in a different manner.

A pattern which can be designated as a "diamond" pattern is depicted in FIGS. 1*a* to 1*c*. In real terms, the pattern according to FIGS. 1*a* and 1*b* corresponds to a scale of 2:1 and the individual representation according to FIG. 1*c* corresponds to a scale of 10:1. This also applies to FIGS. 2 and 3.

The embossing tool's embossing pattern comprises webs 1, four of which respectively form a square or parallelogram and which are arranged side by side such that a network is created by the webs. Successively aligned recesses 2 which represent small raised portions within the embossed intermediate product may be disposed within the web 1. These recesses are not, however, absolutely necessary. A large recess 3 formed by graduated side walls 4*a* and 4*b* is located between the webs. The side walls 4*a* form an angle α with the tool surface 5 and the side walls 4*b* form an angle β which is smaller than the angle α.

The large recess 3 has a depth c in regard to the side wall 4*a*, and a depth d in view of the side walls 4*a* and 4*b*. The aforementioned dimensions have the following values in accordance with a preferred exemplary embodiment:

a: 1 mm
b: 6 mm
c: 1 mm
d: 1.7 mm
α: 65°
e: 0.25 mm.

Figure 2B:
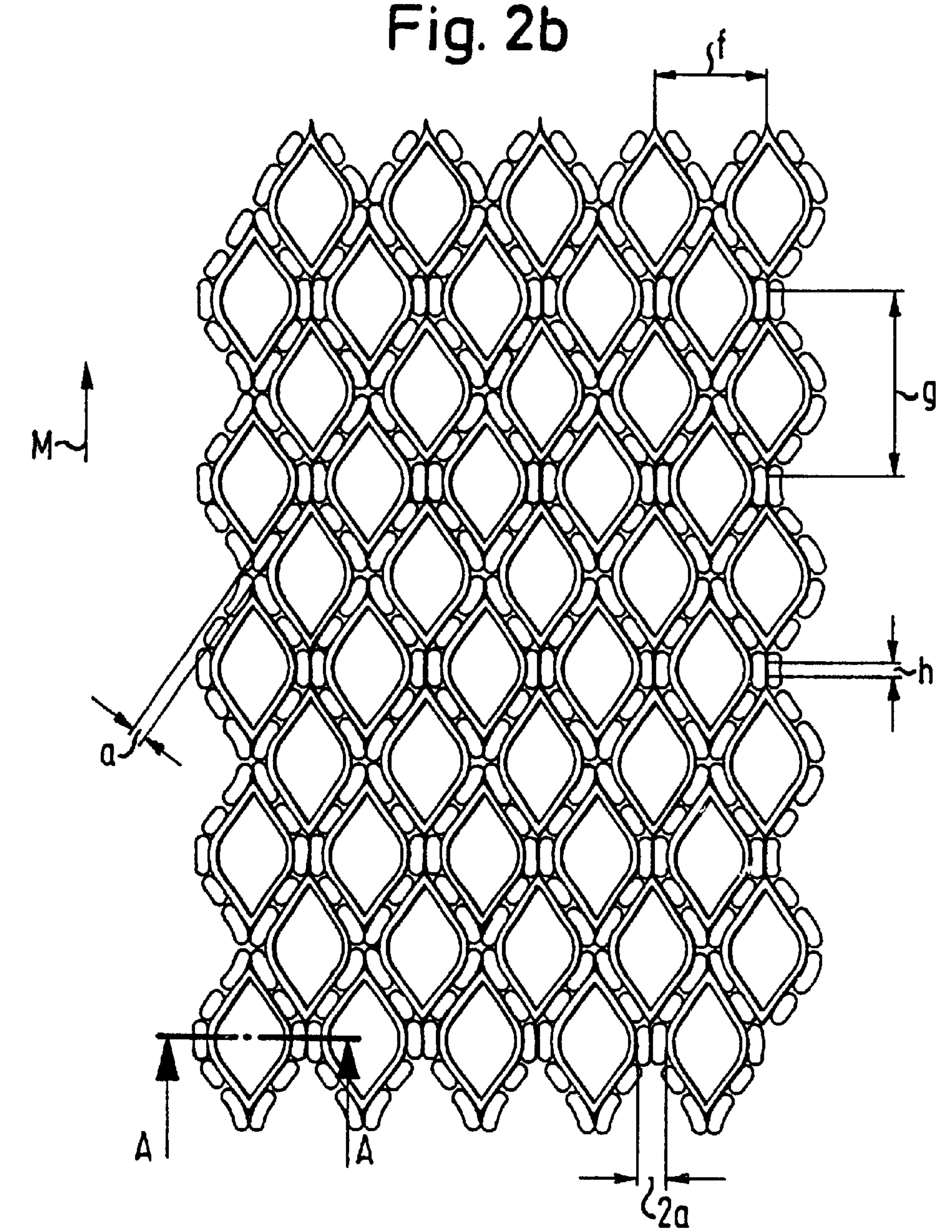
Figure 2C:
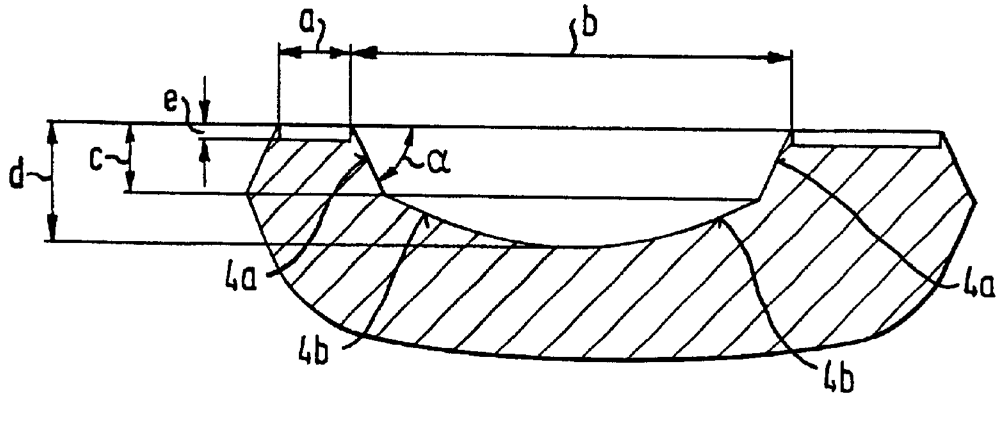

FIG. 2*b* shows an embossing pattern corresponding to a so-called "oriental" pattern, with the machinery direction being indicated by the arrow M. The scale ratios are the same as in FIG. 1, which also, incidentally, applies to FIG. 3. The following dimensions are of relevance here:

a: 1 mm
b: 6 mm
c: 1 mm d: 1.7 mm
f: 8 mm
g: 13.6 mm
h: 1 mm
α: 65°

Figure 3A:
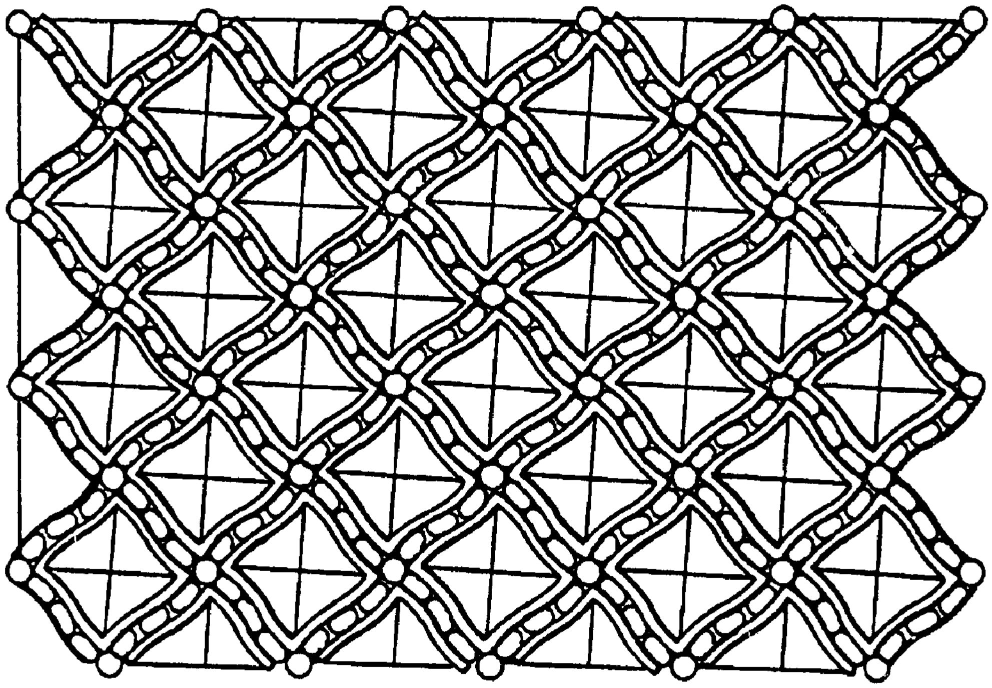
FIGS. 3*a* to 3*c* show views according to FIGS. 1*a* to 1*c* and FIGS. 2*a* to 2*c*, but with another pattern of a different design.
Figure 3B:
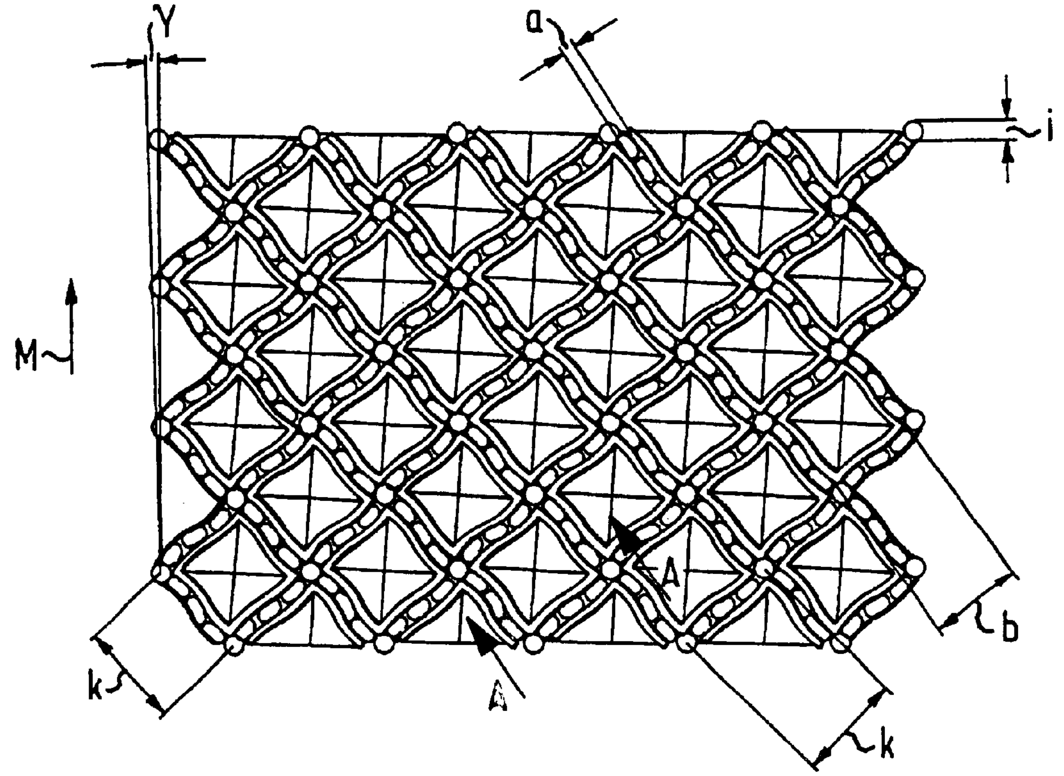
Figure 3C:
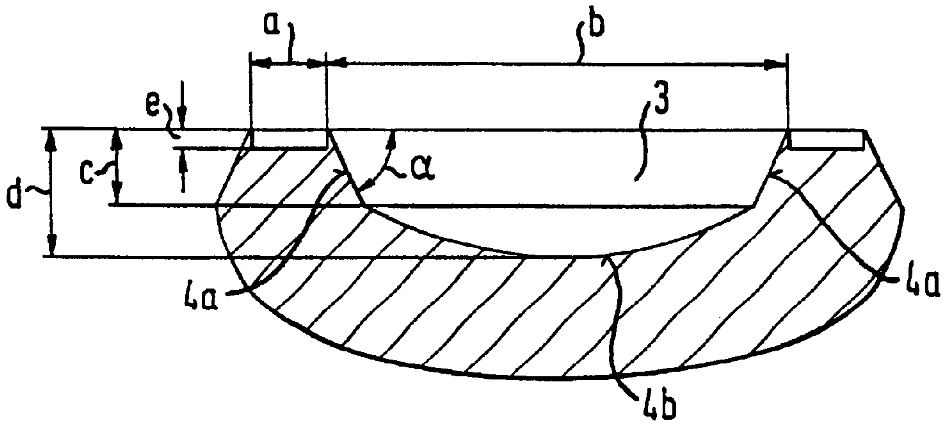

FIG. 3 shows a "pillow"-shaped pattern, with it being possible to offset the pattern relative to the machinery direction through an angle γ of 1.5°. When there is such an offset, the repeat length is approx. 183.21 mm, i.e. 18.5 figures per repeat.

The following values are obtained for the dimensions:

a: 1 mm
b: 6 mm
c: 1 mm
d: 1.7 mm
e: 0.25 mm
i: 1.4 mm in diameter
k: 7 mm
α: 65°.

Figure 6A:
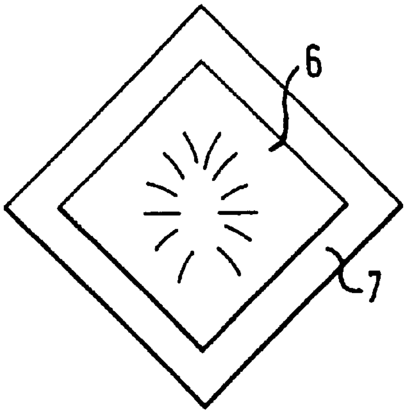
FIG. 6*a* shows a schematic horizontal projection of a raised portion of an embossing pattern from the convex side in an unstretched condition.
Figure 6B:
FIG. 6*b* shows a diagonal sectional view through the raised portion with the representation of a primary bulk produced by the embossing process.
Figure 7A:
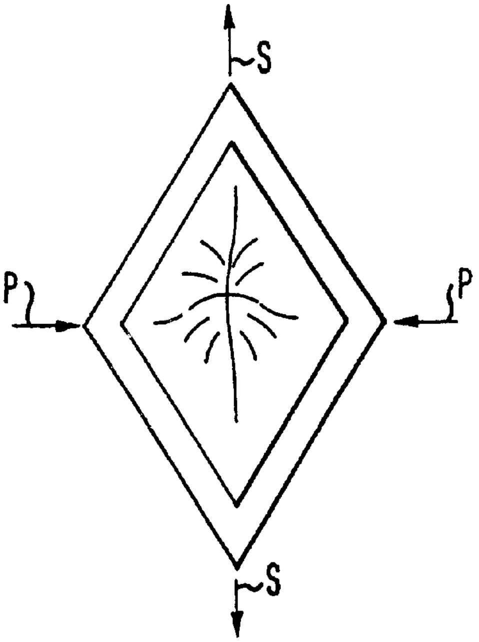
FIGS. 7*a*, 7*b*, 7*c*, 7*d* show a representation similar to FIGS. 6*a* and 6*b*, but after the stretching process, wherein a secondary bulk produced by stretching is identifiable in FIGS. 7*b*, 7*c*, 7*d* as a superimposition of the primary bulk.
Figure 7B:
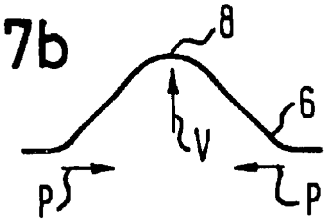
Figure 7C:
Figure 7D:
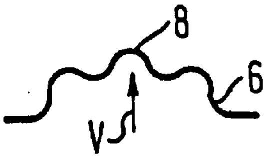
Figure 8B:
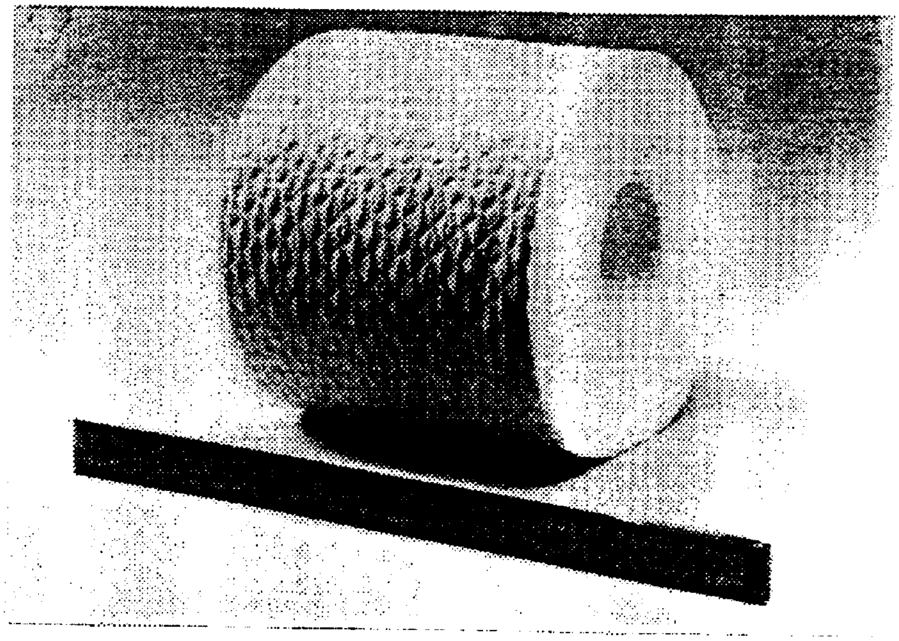
FIG. 8*b* shows a view of a toilet paper roll having the pattern according to FIG. 8*a;*
Figure 8A:
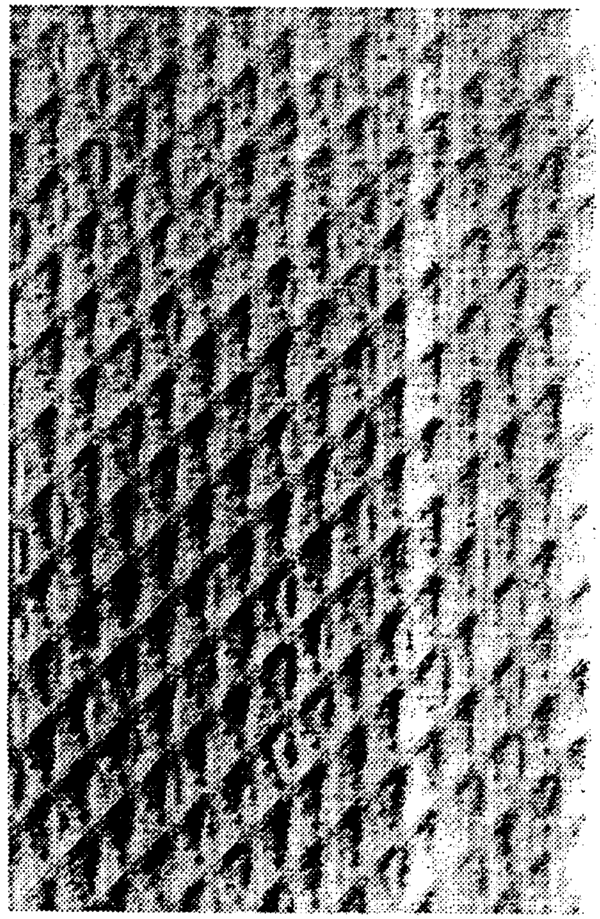
FIG. 8*a* shows a view of the pattern of the final product according to FIG. 1 ("diamond")
Figure 9B:
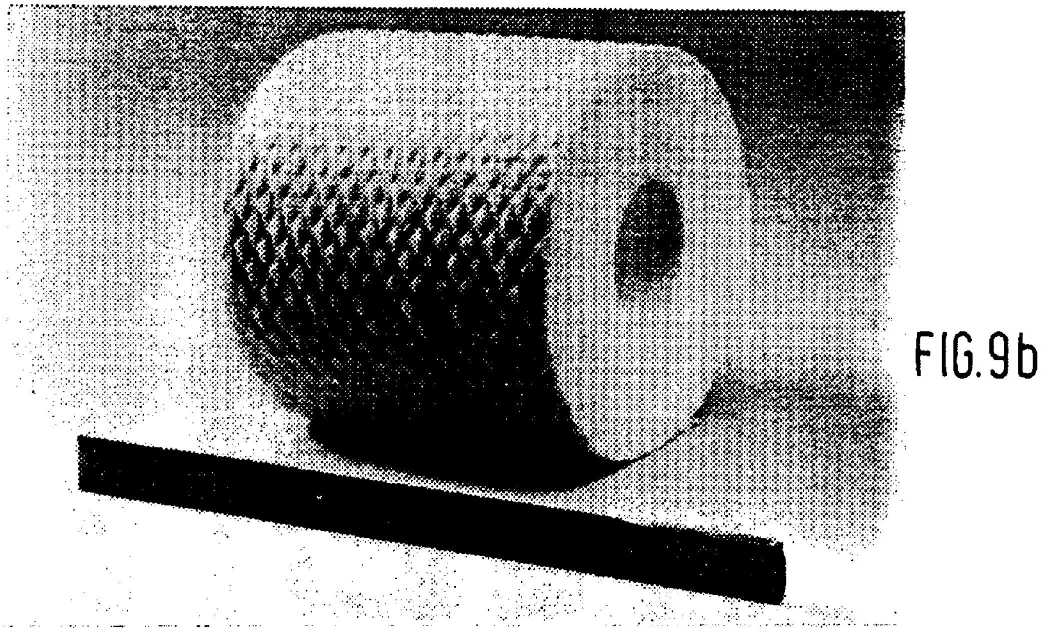
FIG. 9*b* shows a view of a toilet paper roll having the pattern according to FIG. 9*a;*
Figure 9A:
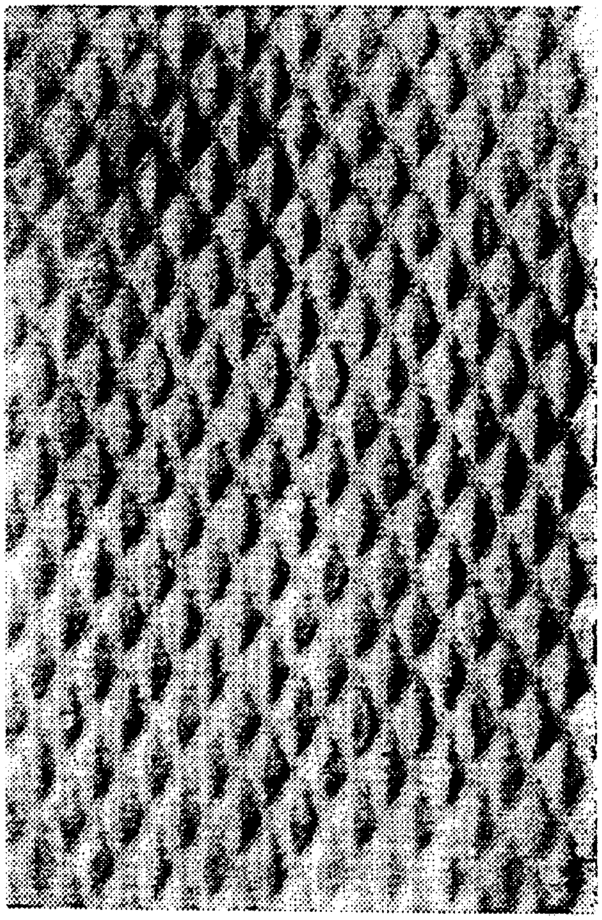
FIG. 9*a* shows a view of the pattern of the final product according to FIG. 2 ("oriental")
Figure 10B:
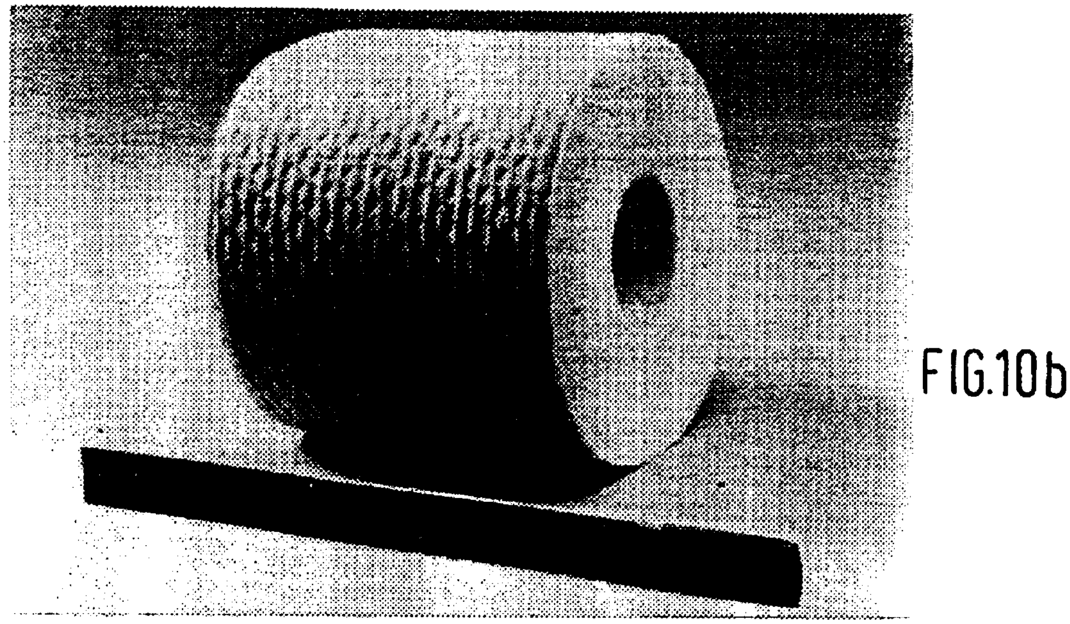
FIG. 10*b* shows a view of a toilet paper roll having the pattern according to FIG. 10*a.*
Figure 10A:
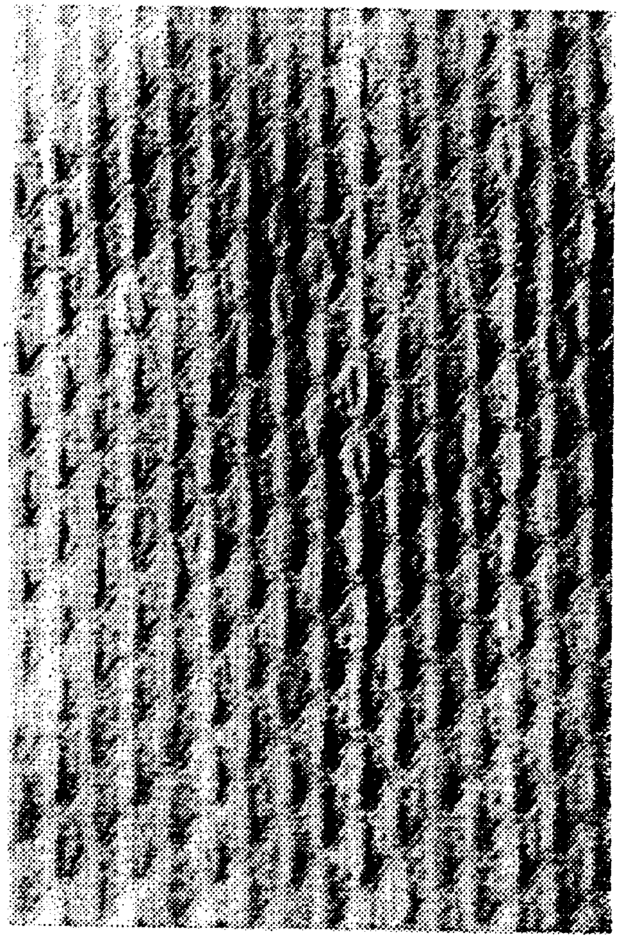
FIG. 10*a* shows a view of the pattern of the final product according to FIG. 3 ("pillow")

If for example a tissue paper as an initial product is lent an embossment in form of a pattern by means of the respective embossing tools, as depicted in FIGS. 1, 2 and 3, a rubber roller presses the tissue paper against the webs 1 and into the recesses 3, on account of which the initial product undergoes an embossment to the extent that the material is compacted and strengthened in the region of the webs, and raised portions 6—as can be inferred for instance from FIG. 6—are produced in the area of the recesses 3. The embossed edge portions are identified by the reference numeral 7 there. They are specifically designated here as embossed lines. Corresponding to the network of webs, these lines form parallelograms, as depicted in FIG. 6*a*, whereby the intersections of the lines are to be regarded as hinge points, as can be inferred for instance from FIGS. 3*a* and 3*b*. With regard to the crosslinking of hinged parallelograms, the complete pattern is able to behave like a mechanical pantograph when stretching forces S are applied in accordance with the representation in FIG. 7*a*, which causes the parallelogram to constrict corresponding to a pantograph movement, as indicated by the arrow P. During the embossing process, a primary bulk is formed as a result of the raised portion 6 and a secondary bulk 8 which is superimposed thereon and indicated by the arrow V in FIGS. 7*b*, 7*c*, 7*d* is formed by the stretching process by means of the stretching forces S. In the case of FIG. 7*c* and FIG. 7*d* the secondary bulk is a superimposed multiple bulk.

Figure 4:
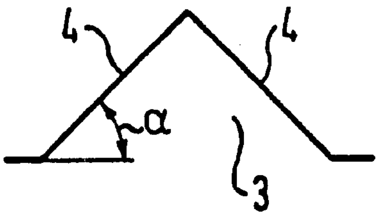
FIG. 4 shows a schematic sectional view of a raised portion of an embossing pattern with a single side wall portion.
Figure 5A:
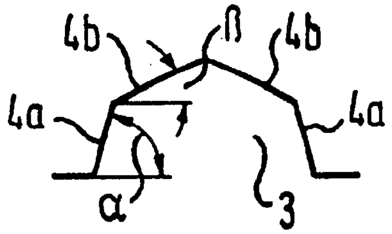
FIGS. 5*a* to 5*c* show various sectional views of a raised portion of an embossing pattern with multiple side wall portions.
Figure 5B:
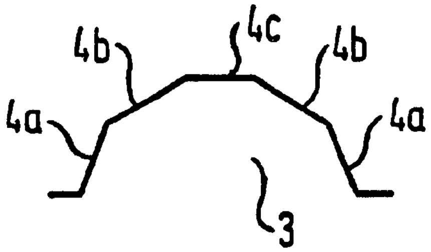
Figure 5C:
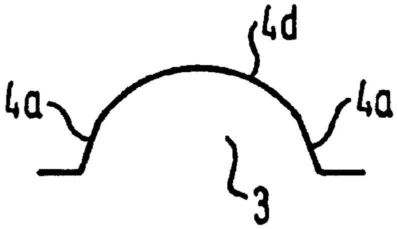

With regard to the tool's recesses, FIG. 4 shows a schematic representation of an exemplary embodiment with individual side walls and an associated angle α. FIG. 5*a* shows a sequence of successively graduated side walls 4*a*, 4*b* with corresponding angles α and β, with the angle β being smaller than the angle α, measured in relation to the tool surface. In accordance with FIG. 5*c*, it is also possible to provide initial side wall portions 4*a*, which are adjoined in a dome-like manner by a curved surface 4*d*.

A few examples will be given in the following so as to explain the invention.

EXAMPLE 1

A two-ply tissue paper web was drawn off from a parent roll and supplied to an embossment unit. The two-ply tissue paper had a basis weight of 21.9 g/m$^2$ and a width of 50 cm. The tissue paper consisted of 100% cellulose pulp. The embossment unit comprised a steel roller and a rubber roller. The steel roller had a diameter of 198 mm. The rubber roller had a diameter of 174 mm with a rubber thickness of 17 mm and a rubber hardness of 33 Shore. The female embossing recesses were dimensioned in accordance with FIGS. 1*b* and 1*c* of the drawings in conjunction with the description belonging thereto. The embossment (nip) pressure between the rollers amounted to 9420 N/m.

The product embossed using this embossment unit was then supplied to a stretching unit (everything within one apparatus) where it was stretched in machine direction across the width with a stretching force (tension) of 30 N/m. There arose the aforementioned secondary bulk which was superimposed on the primary bulk caused by embossing. With respect to the initial product, a bulk increase of 21.4% was obtained. The machine direction (M.D.) strength in this direction decreased by 17.6% vis-a-vis the initial product, i. e. the flexibility increased correspondingly. With respect to the initial product, the break stretch decreased by 12.3% and the cross machine (C.D.) strength by 36.8%.

After stretching, the product was wound up as portions distanced by perforation into longitudinal sections on a roll as toilet paper. This roll had a diameter of 123.2 mm and a firmness of 635 cm×10$^{-3}$.

The aforementioned M.D. strength corresponds to the M.D. tension at break. The two-ply tissue paper or the finished product was cut into samples 76 mm wide and then aligned with the machine direction. The samples were clamped between two jaws of a tensile tester. The jaw space was 51 m and the sample was extended at a rate of 250 mm per minute. The result was the peak force in N recorded at break. A similar approach was adopted in the cross direction. The bulk was measured such that 10 sheets cut from the parent material or 5 sheets from the finished product were stacked and placed in an electronic caliper gauge with a foot pressure of 2.9 kPa. The results were recorded in thousands of a mm.

The basis weight was ascertained such that once again ten sheets cut from the parent material or five sheets of the two-ply finished product were stacked as 10×10 cm squares. The sample was then weighed, the result multiplied by 10 and then reported as kPa.

The diameter of the finished toilet paper roll was measured such that a tape calibrated to indicate the diameter was wound around the circumference of the finished roll.

The firmness of the finished toilet paper roll in cm×10$^{-3}$ was measured as follows. The finished toilet paper roll was held by a rigid bar which was pushed through the core. A lightly weighted gauge was lowered onto the circumference of the roll. After a setting time of approx. 15 seconds, a zero reading was taken from the gauge. A heavier loading weight was then applied and after a stabilization time of 15 seconds, a second reading taken. The difference between the readings was recorded as the roll firmness and was measured in thousands of a cm. The firmness therefore amounted to 635 cm×10$^{-3}$.

EXAMPLE 2

The sequence is basically the same as in Example 1, but with the following modifications. The embossing tool corresponded to the data according to FIGS. 2*b* and 2*c*. The diameter of the steel roller was 191 mm.

The decrease in M.D. strength (increase in flexibility) with respect to the initial product was 22.9% in the case of the finished roll and the corresponding decrease in C.D. strength was 39.3%. The increase in bulk was 12%. The finished roll had a diameter of 123.7 mm and had a firmness of 622.3 cm×10$^{-3}$.

Comparative Example

A comparative example was realized using a pattern according to FIG. 1. The diameter of the steel roller was nevertheless 197 mm. The angle α amounted to 38°, value b was 7.2 mm and the value d was 1.3 mm. Only a bulk 1.7% was obtained. The diameter of the finished toilet paper roll amounted to 120 mm and the firmness was 503 cm$\times10^{-3}$.

What is claimed is:

1. A method of producing a relatively soft, essentially planar, though three-dimensional product including the production steps of:

a) converting to an intermediate product, a relatively soft, essentially flat planar starting product by embossing a three-dimensional pattern that generates a primary bulk with respect to said starting product; and b) stretching this intermediate product achieved by embossing of said initial product essentially in the direction of its largely planar extension for generating a superimposed, secondary bulk with respect to said intermediate product converted by embossing.

2. A method according to claim 1, according to which the embossing pattern of said intermediate product is formed from a plurality of "hinged parallelograms" crosslinked together, and that the stretching occurs roughly in a direction running diagonally through said parallelograms.

3. A relatively soft, largely planar, though three-dimensional product having a three-dimensional embossing pattern and a secondary bulk superimposed by stretching on this embossing pattern as an inherent primary bulk.

4. A product according to claim 3, wherein said secondary bulk is convex and is disposed on the convex side of said embossing pattern that forms said primary bulk.

5. A product according to claim 3, wherein said embossing pattern is essentially a symmetrical embossing pattern.

6. A product according to claim 3, wherein within said embossing pattern, the embossed individual shapes as a horizontal projection have a form which is designed between the shape of a circle (clearly removed from the shape of the circle) and that of a square or rectangle.

7. A product according to claim 3, wherein said embossing pattern is largely a rhombic pattern.

8. A product according to claim 3, wherein lines that are essentially embossed on a plane are formed within said embossing pattern between said individual shapes, said lines being connected together and four thereof respectively forming a kind of hinged parallelogram and many such hinged parallelograms being crosslinked together.

9. A relatively soft, largely planar, though three-dimensional product, obtainable by a planar three-dimensional intermediate product provided with an embossing pattern that forms a primary bulk and produced by an embossing tool, said intermediate product being lent a lasting secondary bulk that is superimposed on said primary bulk as a result of stretching essentially in the direction of its largely planar extension.

10. A product according to claim 9, for which said embossing tool has recesses into which the material of said planar starting product is pressed for said lasting primary bulk.

11. A product according to claim 9, for which said embossing tool comprises webs connected together between said recesses, said webs together with said recesses lending said intermediate product an embossing pattern in which raised portions corresponding to said recesses are limited by lines of compressed and hence strengthened material, said lines being embossed by said webs and forming hinged parallelograms that are connected together in a network-like manner such that this network acts as a pantograph when opposite stretching forces are applied in the direction of the large planar extension and essentially in the diagonal direction of said intermediate product's hinged parallelograms.

12. A product according to claim 9, for which the side walls of said recesses of said embossing tool extend at a specific acute angle on all sides starting from the tool surface.

13. A product according to claim 12, for which said angle is not less than about 40° and particularly not less than about 60° and in particular is 65°.

14. A product according to claim 9, for which said recesses comprise graduated side walls in that a plurality of wall sections is juxtaposed into the depth of said recesses starting from the tool surface, and said acute angle formed by said wall portions relative to the tool surface decreases in size from wall portion to wall portion.

15. A product according to claim 9, for which the number of said individual shapes per square centimeter is 0.5 to 6 and particularly 1 to 2.5.

16. A product according to claim 9, for which the ratio of the depth of said recesses to the width is 0.1 to 0.5 and particularly 0.2 to 0.3.

17. A product according to claim 9, for which said webs between said recesses have a width of 0.5 mm to 3 mm and particularly 1.2 mm to 2.2 mm.

18. A product according to claim 9, for which said webs comprise a profile and particularly a row of recesses formed along said webs.

19. A product according to claim 3, wherein the material used is tissue.

20. A product according to claim 4, wherein the embossing pattern is essentially a symmetrical embossing pattern.

21. A product according to claim 4, wherein lines that are essentially embossed on a plane are formed within said embossing pattern between said individual shapes, said lines being connected together and four thereof respectively forming a kind of hinged parallelogram and many such hinged parallelograms being crosslinked together.

22. A product according to claim 5, wherein lines that are essentially embossed on a plane are formed within said embossing pattern between said individual shapes, said lines being connected together and four thereof respectively forming a kind of hinged parallelogram and many such hinged parallelograms being crosslinked together.

23. A product according to claim 6, wherein lines that are essentially embossed on a plane are formed within said embossing pattern between said individual shapes, said lines being connected together and four thereof respectively forming a kind of hinged parallelogram and many such hinged parallelograms being crosslinked together.

24. A product according to claim 7, wherein lines that are essentially embossed on a plane are formed within said embossing pattern between said individual shapes, said lines being connected together and four thereof respectively forming a kind of hinged parallelogram and many such hinged parallelograms being crosslinked together.

25. A product according to claim 20, wherein lines that are essentially embossed on a plane are formed within said embossing pattern between said individual shapes, said lines being connected together and four thereof respectively forming a kind of hinged parallelogram and many such hinged parallelograms being crosslinked together.

26. A method according to claim 1, wherein lines that are essentially embossed on a plane are formed within said embossing pattern between said individual shapes, said lines being connected together and four thereof respectively forming a kind of hinged parallelogram and many such hinged parallelograms being crosslinked together.

27. A method according to claim 2, wherein lines that are essentially embossed on a plane are formed within said embossing pattern between said individual shapes, said lines being connected together and four thereof respectively forming a kind of hinged parallelogram and many such hinged parallelograms being crosslinked together.

28. The method of claim 1, wherein bulk or thickness of said product is increased by said stretching.

29. The method of claim 28, wherein bulking primarily takes place in a direction perpendicular to a large surface of said initial product.

30. The method of claim 29, wherein when said stretching (S) takes place, constriction (P) takes place in a normal direction to said stretching (S), resulting in constriction corresponding to a pantograph movement and said secondary bulk (8) being superimposed upon said primary bulk (6).

31. The product of claim 3, wherein bulk or thickness of said product is increased by said stretching.

32. The product of claim 31, wherein bulking primarily takes place in a direction perpendicular to a large surface of said initial product.

33. The product of claim 32, wherein when said stretching (S) takes place, constriction (P) takes place in a normal direction to said stretching (S), resulting in constriction corresponding to a pantograph movement and said secondary bulk (8) being superimposed upon said primary bulk (6).

34. The product of claim 9, wherein bulk or thickness of said product is increased by said stretching.

35. The product of claim 34, wherein bulking primarily takes place in a direction perpendicular to a large surface of said initial product.

36. The product of claim 35, wherein when said stretching (S) takes place, constriction (P) takes place in a normal direction to said stretching (S), resulting in constriction corresponding to a pantograph movement and resulting in said secondary bulk (8) being superimposed upon said primary bulk (6).

* * * * *